(12) United States Patent
Butcher et al.

(10) Patent No.: US 10,402,219 B2
(45) Date of Patent: Sep. 3, 2019

(54) MANAGING SHARED SERVICES IN RECONFIGURABLE FPGA REGIONS

(71) Applicant: Dell Products L.P., Round Rock, TX (US)

(72) Inventors: Andrew Butcher, Cedar Park, TX (US); Shawn Joel Dube, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 178 days.

(21) Appl. No.: 15/616,732

(22) Filed: Jun. 7, 2017

(65) Prior Publication Data

US 2018/0357090 A1  Dec. 13, 2018

(51) Int. Cl.
G06F 9/455 (2018.01)

(52) U.S. Cl.
CPC .. G06F 9/45558 (2013.01); *G06F 2009/4557* (2013.01); *G06F 2009/45579* (2013.01)

(58) Field of Classification Search
CPC .............. G06F 9/5077; G06F 15/7867; G06F 15/7871; G06F 17/5054; G06F 9/5005; G06F 9/5022
See application file for complete search history.

(56) References Cited

U.S. PATENT DOCUMENTS

| | | | |
|---|---|---|---|
| 7,734,895 B1 | 6/2010 | Agarwal et al. | |
| 7,882,307 B1 | 2/2011 | Wentzlaff et al. | |
| 8,095,929 B1 | 1/2012 | Ji et al. | |
| 10,069,681 B2 | 9/2018 | Izenberg et al. | |
| 10,120,798 B1 * | 11/2018 | Smith | G06F 12/08 |
| 2008/0235756 A1 | 9/2008 | Cohen et al. | |
| 2009/0187756 A1 | 7/2009 | Nollet et al. | |
| 2011/0093849 A1 | 4/2011 | Chawla et al. | |
| 2013/0205295 A1 | 8/2013 | Ebcioglu et al. | |
| 2015/0128268 A1 | 5/2015 | Fine et al. | |
| 2015/0169376 A1 * | 6/2015 | Chang | G06F 9/48 718/104 |

(Continued)

OTHER PUBLICATIONS

Charitopoulos, George, et al. "Hardware task scheduling for partially reconfigurable FPGAs." International Symposium on Applied Reconfigurable Computing. Springer International Publishing, 2015; 12 pages.

(Continued)

*Primary Examiner* — Dong U Kim
(74) *Attorney, Agent, or Firm* — Baker Botts L.L.P.

(57) ABSTRACT

An information handling system may include a field-programmable gate array (FPGA) and an FPGA service manager, within a hypervisor, to receive from software running in a virtual machine a request for an FPGA service, load a bitstream for the service into a first region of the FPGA, increment a count of concurrent users of the bitstream, determine, subsequent to a further update to the count, whether the count is zero or non-zero, and reclaim the first region of the FPGA if the count is zero. The bitstream may be received from the virtual machine or from a catalog of bitstreams maintained on the hypervisor. The FPGA service manager may load a second instance of the bitstream into a second region of the FPGA dependent on execution constraints specified in a bitstream header, or may load a bitstream for a second service into the second region of the FPGA.

20 Claims, 6 Drawing Sheets

(56) References Cited

U.S. PATENT DOCUMENTS

| | | |
|---|---|---|
| 2015/0304459 A1 | 10/2015 | Pakula et al. |
| 2016/0170793 A1 | 6/2016 | Decusatis et al. |
| 2016/0246653 A1 | 8/2016 | Ebcioglu et al. |
| 2016/0321113 A1* | 11/2016 | Pinto ................... G06F 9/45533 |
| 2017/0075706 A1 | 3/2017 | Apfelbaum et al. |
| 2017/0177396 A1 | 6/2017 | Palermo et al. |
| 2017/0195173 A1* | 7/2017 | Izenberg ............. G06F 9/45558 |
| 2017/0264680 A1* | 9/2017 | Palermo ................. H04L 43/16 |
| 2018/0004564 A1 | 1/2018 | Konishi |
| 2018/0088992 A1 | 3/2018 | Davis et al. |
| 2018/0095774 A1 | 4/2018 | Atta et al. |
| 2018/0173548 A1 | 6/2018 | Schoenberg |
| 2018/0196951 A1 | 7/2018 | Hoppert |
| 2018/0205553 A1 | 7/2018 | Hoppert et al. |
| 2018/0213669 A1 | 7/2018 | Kochukunju et al. |
| 2018/0253320 A1 | 9/2018 | Emejulu et al. |
| 2018/0255157 A1 | 9/2018 | Butcher et al. |
| 2018/0300165 A1* | 10/2018 | Johnson .................. H04L 67/34 |
| 2018/0357098 A1 | 12/2018 | Dube et al. |

OTHER PUBLICATIONS

An, Xin, et al. "Autonomic Management of Dynamically Partially Reconfigurable FPGA Architectures Using Discrete Control." ICAC. 2013; 5 pages.

Wheeler, David A. "3. Shared Libraries," Program Library HOWTO, Apr. 11, 2003; 8 pages.

Wikipedia, The Free Encyclopedia, Mar. 30, 2017. https://en.wikipedia.org/wiki/Executable_and_Linkable_Format; 15 pages.

Xilinx BIT bitstream files, retrieved on Mar. 30, 2017. http://www.pldtool.com/pdf/fmt_xilinxbit.pdf; 1 page.

* cited by examiner

400

| SERVICE NAME 410 | | |
|---|---|---|
| REVISION 412 | BACKWARD COMPATIBILITY 414 | |
| CONCURRENT COUNT MAXIMUM 416 | QUEUE HIGH THRESHOLD 418 | MAXIMUM BANDWIDTH 420 |
| FPGA/CPU CLASS TAG 432-1 | BINARY IMAGE 430-1 | |
| PERFORMANCE/CAPABILITY INFORMATION 433-1 | | |
| FPGA/CPU CLASS TAG 432-2 | BINARY IMAGE 430-2 | |
| PERFORMANCE/CAPABILITY INFORMATION 433-2 | | |
| FPGA/CPU CLASS TAG 432-3 | BINARY IMAGE 430-3 | |
| PERFORMANCE/CAPABILITY INFORMATION 433-3 | | |

FIG. 4

MANAGING SHARED SERVICES IN RECONFIGURABLE FPGA REGIONS

BACKGROUND

Field of the Disclosure

This disclosure relates generally to information handling systems and, more particularly, to managing shared services in reconfigurable regions of an FPGA.

Description of the Related Art

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increasingly, information handling systems are deployed in architectures that allow multiple operating systems to run on a single information handling system. Labeled "virtualization," this type of information handling system architecture decouples software from hardware and presents a logical view of physical hardware to software. In a virtualized information handling system, a single physical server may instantiate multiple, independent virtual servers. Server virtualization is enabled primarily by a piece of software (often referred to as a "hypervisor") that provides a software layer between the server hardware and the multiple operating systems, also referred to as guest operating systems (guest OS). The hypervisor software provides a container that presents a logical hardware interface to the guest operating systems. An individual guest OS, along with various applications or other software executing under the guest OS, may be unaware that execution is occurring in a virtualized server environment (as opposed to a dedicated physical server). Such an instance of a guest OS executing under a hypervisor may be referred to as a "virtual machine". Virtual machines may be managed by a virtual machine manager, such as, for example, a hypervisor.

Adoption of the use of Field Programmable Gate Arrays (FPGAs) as computing accelerators has been relatively slow for the mass market and has primarily been taken on by specialized niche applications, such as for high frequency trading. However, recent evidence indicates that the use of FPGAs as computing accelerators is likely to increase, and that FPGAs may be increasingly available in hosted cloud computing environments.

SUMMARY

In one aspect, a disclosed information handling system includes a field-programmable gate array (FPGA), and a hypervisor configured to manage one or more virtual machines operating on the information handling system. The hypervisor includes an FPGA service manager configured to receive a request for a first service to be loaded on the FPGA on behalf of a software application running in a first virtual machine, to load a first instance of a bitstream for the first service into a first region of the FPGA, to increment a count of concurrent users of the first instance of the bitstream for the first service, to determine, subsequent to a further update to the count of concurrent users of the first instance of the bitstream for the first service, whether the count of concurrent users of the first instance of the bitstream for the first service is zero or non-zero, and to reclaim the first region of the FPGA in response to determining that the count of concurrent users of the first instance of the bitstream for the first service is zero.

In any of the disclosed embodiments, to load the first instance of the bitstream for the first service into the first region of the FPGA, the FPGA service manager may be configured to receive the bitstream for the first service from the first virtual machine.

In any of the disclosed embodiments, the hypervisor may maintain a catalog including bitstreams for a plurality of services, and to load the first instance of the bitstream for the first service into the first region of the FPGA, the FPGA service manager may be configured to obtain the bitstream for the first service from the catalog.

In any of the disclosed embodiments, the catalog may include multiple bitstreams for the first service, each of which implements a respective version of the first service. Each of the multiple bitstreams for the first service may include a header including an indicator of an FPGA type with which the respective version of the first service is compatible. To load the first instance of the bitstream for the first service into the first region of the FPGA, the FPGA service manager may be configured to obtain a selected one of the multiple bitstreams for the first service from the catalog, the selection being dependent on the indicator in the header of the selected bitstream.

In any of the disclosed embodiments, the catalog may include, for each of the plurality of services, data representing execution constraints for the service. The catalog may include multiple bitstreams for the first service, each of which implements a respective version of the first service. The execution constraints for the first service may include a respective header for each of the multiple bitstreams for the first service including data representing bitstream-specific execution constraints.

In any of the disclosed embodiments, the FPGA service manager may be further configured to receive a request for the first service on behalf of another software application running in the one or more virtual machines, to increment the count of concurrent users of the first instance of the bitstream for the first service, to determine, dependent on the count of concurrent users of the first instance of the bitstream for the first service and on the execution constraints for the first service, whether criteria for loading a second instance of the bitstream for the first service on the FPGA is met, to load a second instance of the bitstream for the first service into a second region of the FPGA in response to determining that criteria for loading a second instance of the bitstream for the first service on the FPGA is met, and to refrain from loading a second instance of the bitstream for the first service into a second region of the FPGA in response to determining that criteria for loading a second instance of the bitstream for the first service on the FPGA is not met.

In any of the disclosed embodiments, the FPGA service manager may be further configured to receive a request for a second service to be loaded on the FPGA on behalf of the software application running in the first virtual machine, to load a first instance of a bitstream for the second service into a second region of the FPGA, and to increment a count of concurrent users of the first instance of the bitstream for the second service.

In any of the disclosed embodiments, the FPGA service manager may maintain, for each bitstream instance loaded in a respective region of the FPGA on behalf of one or more software applications running in the one or more virtual machines, a respective count of concurrent users of the bitstream instance.

In another aspect, a disclosed method is for managing shared services in reconfigurable regions of a field-programmable gate array (FPGA). The method may include receiving, by an FPGA service manager running in a hypervisor, a request for a first service to be loaded on the FPGA on behalf of a software application running in a first virtual machine, loading a first instance of a bitstream for the first service into a first region of the FPGA, incrementing a count of concurrent users of the first instance of the bitstream for the first service, determining, subsequent to a further update to the count of concurrent users of the first instance of the bitstream for the first service, whether the count of concurrent users of the first instance of the bitstream for the first service is zero or non-zero, and reclaiming the first region of the FPGA in response to determining that the count of concurrent users of the first instance of the bitstream for the first service is zero.

In any of the disclosed embodiments, loading the first instance of the bitstream for the first service into the first region of the FPGA may include receiving the bitstream for the first service from the first virtual machine.

In any of the disclosed embodiments, the hypervisor may maintain a catalog including bitstreams for a plurality of services, and loading the first instance of the bitstream for the first service into the first region of the FPGA may include obtaining the bitstream for the first service from the catalog.

In any of the disclosed embodiments, the catalog may include multiple bitstreams for the first service, each of which implements a respective version of the first service. Each of the multiple bitstreams for the first service may include a header including an indicator of an FPGA type with which the respective version of the first service is compatible. Loading the first instance of the bitstream for the first service into the first region of the FPGA may include obtaining a selected one of the multiple bitstreams for the first service from the catalog, the selection being dependent on the indicator in the header of the selected bitstream.

In any of the disclosed embodiments, the catalog may include, for each of the plurality of services, data representing execution constraints for the service. The catalog may include multiple bitstreams for the first service, each of which implements a respective version of the first service. The execution constraints for the first service may include a respective header for each of the multiple bitstreams for the first service including data representing bitstream-specific execution constraints.

In any of the disclosed embodiments, the method may further include receiving a request for the first service on behalf of another software application running in a second virtual machine, incrementing the count of concurrent users of the first instance of the bitstream for the first service, determining, dependent on the count of concurrent users of the first instance of the bitstream for the first service and on the execution constraints for the first service, whether criteria for loading a second instance of the bitstream for the first service on the FPGA is met, and loading a second instance of the bitstream for the first service into a second region of the FPGA in response to determining that criteria for loading a second instance of the bitstream for the first service on the FPGA is met.

In any of the disclosed embodiments, the method may further include receiving a request for the first service on behalf of another software application running in a second virtual machine, incrementing the count of concurrent users of the first instance of the bitstream for the first service, determining, dependent on the count of concurrent users of the first instance of the bitstream for the first service and on the execution constraints for the first service, whether criteria for loading a second instance of the bitstream for the first service on the FPGA is met, and refraining from loading a second instance of the bitstream for the first service into a second region of the FPGA in response to determining that criteria for loading a second instance of the bitstream for the first service on the FPGA is not met.

In any of the disclosed embodiments, the FPGA service manager may maintain, for each bitstream instance loaded in a respective region of the FPGA on behalf of one or more software applications running in the one or more virtual machines, a respective count of concurrent users of the bitstream instance, and the method may further include receiving a request for a second service to be loaded on the FPGA on behalf of the software application running in the first virtual machine, loading a first instance of a bitstream for the second service into a second region of the FPGA, and incrementing a count of concurrent users of the first instance of the bitstream for the second service.

A further disclosed aspect includes a system including a field-programmable gate array (FPGA), and a processor subsystem having access to a memory subsystem. The memory subsystem may store instructions executable by the processor subsystem that, when executed by the processor subsystem, cause the processor subsystem to implement an FPGA service manager. The FPGA service manager may be configured to receive a request for a first service to be loaded on the FPGA on behalf of a software application running in a first virtual machine, to load a first instance of a bitstream for the first service into a first region of the FPGA, to increment a count of concurrent users of the first instance of the bitstream for the first service, to determine, subsequent to a further update to the count of concurrent users of the first instance of the bitstream for the first service, whether the count of concurrent users of the first instance of the bitstream for the first service is zero or non-zero, and to reclaim the first region of the FPGA in response to determining that the count of concurrent users of the first instance of the bitstream for the first service is zero.

In any of the disclosed embodiments, to load the first instance of the bitstream for the first service into the first region of the FPGA, the FPGA service manager may be configured to receive the bitstream for the first service from the first virtual machine.

In any of the disclosed embodiments, the FPGA service manager may maintain a catalog including bitstreams for a plurality of services. The catalog may include multiple bitstreams for the first service, each of which implements a respective version of the first service. Each of the multiple bitstreams for the first service may include a header including an indicator of an FPGA type with which the respective version of the first service is compatible. To load the first instance of the bitstream for the first service into the first region of the FPGA, the FPGA service manager may be configured to obtain a selected one of the multiple bitstreams for the first service from the catalog, the selection being dependent on the indicator in the header of the selected bitstream.

In any of the disclosed embodiments, the FPGA service manager may maintain a catalog including bitstreams for a plurality of services. The catalog may include, for each of the plurality of services, data representing execution constraints for the service. The catalog may include multiple bitstreams for the first service, each of which implements a respective version of the first service. The execution constraints for the first service may include a respective header for each of the multiple bitstreams for the first service including data representing bitstream-specific execution constraints. The FPGA service manager may be further configured to receive a request for the first service on behalf of another software application running in the one or more virtual machines, to increment the count of concurrent users of the first instance of the bitstream for the first service, to determine, dependent on the count of concurrent users of the first instance of the bitstream for the first service and on the execution constraints for the first service, whether criteria for loading a second instance of the bitstream for the first service on the FPGA is met, to load a second instance of the bitstream for the first service into a second region of the FPGA in response to determining that criteria for loading a second instance of the bitstream for the first service on the FPGA is met, and to refrain from loading a second instance of the bitstream for the first service into a second region of the FPGA in response to determining that criteria for loading a second instance of the bitstream for the first service on the FPGA is not met.

BRIEF DESCRIPTION OF THE DRAWINGS

For a more complete understanding of the present invention and its features and advantages, reference is now made to the following description, taken in conjunction with the accompanying drawings, in which:

FIG. 4 illustrates selected elements of an embodiment of an FPGA service catalog;

DESCRIPTION OF PARTICULAR EMBODIMENT(S)

Figure 1:
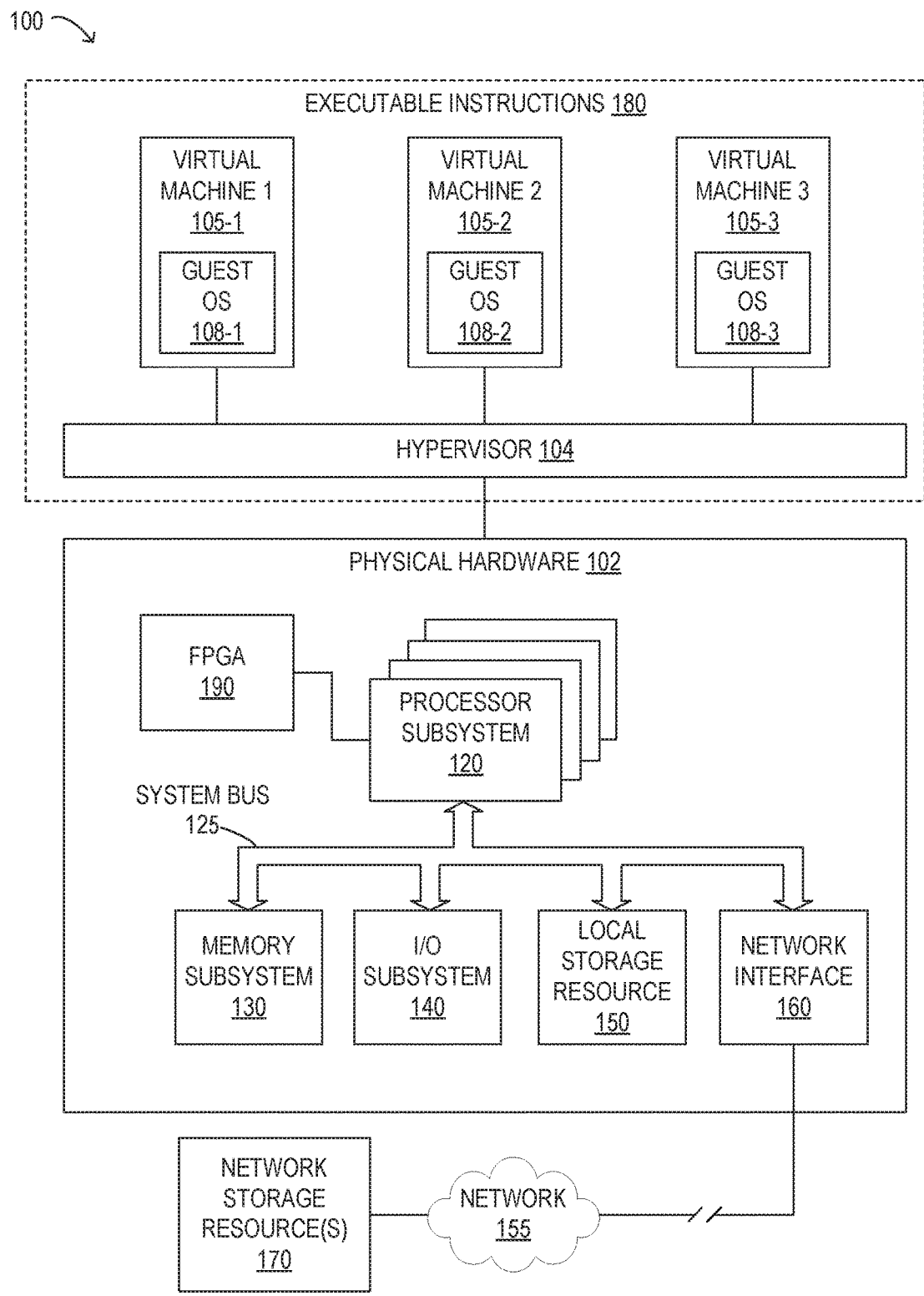
FIG. 1 is a block diagram illustrating selected elements of an embodiment of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. In various embodiments, information handling system 100 may represent a personal computing device, such as a personal computer system, a desktop computer, a laptop computer, a notebook computer, a PDA, a consumer electronic device, or another suitable device operated by a user. In other embodiments, an information handling system may represent a mainframe computer, such as a computer operating as a server or configured for shared use by multiple concurrent users, a network storage device, or another suitable device. Information handling systems may vary in size, shape, performance, functionality, and price, in different embodiments. An information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor described more fully below may comprise firmware. As used in this disclosure, the term "firmware" may refer to software embedded in an information handling system component used to perform predefined tasks. Firmware is commonly stored in non-volatile memory, or memory that does not lose stored data upon the loss of power. In certain embodiments, firmware associated with an information handling system component may be stored in non-volatile memory that is accessible to one or more information handling system components. In the same or alternative embodiments, firmware associated with an information handling system component may be stored in non-volatile memory that is dedicated to and comprises part of that component. For example, in some embodiments, BIOS firmware which may implement the Basic Input/Output System (BIOS) firmware interface, may represent pre-boot instructions executable by a processor subsystem of an information handling system for preparing the information handling system to boot by activating various hardware components in preparation of launching an operating system for execution.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), flash memory (SSD); as well as communications media such wires, optical fibers, microwaves, radio waves, and other electromagnetic or optical carriers; or any combination of the foregoing.

As will be described in further detail, the inventors of the present disclosure have developed systems and methods disclosed herein for managing shared services in reconfigurable regions of an FPGA included in, or coupled to, an information handling system that implements virtualization technology. As noted previously, virtualization enables multiple workloads to run on a single physical machine. In at least some embodiments, such a system may include an FPGA and an FPGA service manager, within a hypervisor, that manages the loading of multiple bitstreams, each implementing an FPGA service on behalf of one or more software applications executing in virtual machines in the system, into respective reconfigurable regions of the FPGA and the reclamation of regions of the FPGA when they are no longer needed. As used herein, the term "FPGA service" may refer to a service provided to a software application by a bitstream loaded on an FPGA.

Particular embodiments are best understood by reference to FIGS. 1-6, in which like numbers are used to indicate like and corresponding parts.

Turning now to the drawings, FIG. 1 illustrates a block diagram depicting selected elements of an embodiment of information handling system 100. It is noted that FIG. 1 is not drawn to scale but is a schematic illustration. As depicted in FIG. 1, information handling system 100 may include physical hardware 102, and executable instructions 180 (including a hypervisor 104 and one or more virtual machines 105). Also shown with information handling system 100 are external or remote elements, namely, network 155 and network storage resource(s) 170.

As shown in FIG. 1, components of information handling system 100 may include, but are not limited to, a processor subsystem 120, which may comprise one or more processors, and system bus 125 that communicatively couples various system components to processor subsystem 120 including, for example, a memory subsystem 130, an I/O subsystem 140, local storage resource 150, and a network interface 160. System bus 125 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express (PCIe) bus, Hyper-Transport (HT) bus, and Video Electronics Standards Association (VESA) local bus.

In FIG. 1, network interface 160 may be a suitable system, apparatus, or device operable to serve as an interface between information handling system 100 and network 155. Network interface 160 may enable information handling system 100 to communicate over network 155 using a suitable transmission protocol or standard, including, but not limited to, transmission protocols or standards enumerated below with respect to the discussion of network 155. In some embodiments, network interface 160 may be communicatively coupled via network 155 to a network storage resource 170. The network 155 coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network 155 coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network 155 coupled to network interface 160 or various components associated therewith may be implemented using hardware, software, or any combination thereof.

As depicted in FIG. 1, processor subsystem 120 may comprise a system, device, or apparatus operable to interpret and/or execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory subsystem 130 or local storage resource 150). In the same or alternative embodiments, processor subsystem 120 may interpret and execute program instructions and process data stored remotely (e.g., in network storage resources 170).

In some embodiments, a memory subsystem within processor subsystem 120 may include multiple data caches, such as one or more level 1 (L1) caches and/or level 2 (L2) caches (not shown). For example, a level 1 cache may be local to a particular processor or processor core within processor subsystem 120, and a level 2 cache may be shared between multiple processors or processor cores within a processor subsystem 120. In some embodiments of the present disclosure, one or more of these caches may be implemented as write-back caches. In such embodiments, the modified contents of the write-back caches may be written out to persistent memory (e.g., a non-volatile memory within memory subsystem 130 or local storage resource 150) under certain circumstances. A cache controller within a memory subsystem of processor subsystem 120 may include circuitry to manage the contents of one or more L1 caches and/or L2 caches. For example, a cache controller may include circuitry to determine when and if an individual cache line or a group of cache lines should be flushed to persistent memory (such as a solid-state storage device within local storage resource 150 or network storage resource 170) or otherwise evicted from one of the caches in accordance with a predetermined cache line replacement policy.

Also in FIG. 1, memory subsystem 130 may comprise a system, device, or apparatus operable to retain and retrieve program instructions and data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, or a suitable selection or array of volatile or non-volatile memory that retains data after power is removed. In some embodiments, memory subsystem 130 may include a level 3 (L3) cache or a last-level cache (not shown), which may be shared between processors or processor cores in multiple processor subsystems 120. Local storage resource 150 may comprise computer-readable media (e.g., hard disk drive, floppy disk drive, CD-ROM, and/or other type of rotating storage media, flash memory, EEPROM, or another type of solid state storage media) and may be generally operable to store instructions and data, and to permit access to stored instructions and data on demand. Likewise, network storage resource 170 may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data. In at least some embodiments, local storage resource 150 or network storage resources 170 may include a collection or array of storage devices and a storage controller. In some embodiments, information handling system 100 may have a redundant array of independent disks (RAID) installed thereon. For example, local storage resource 150 or network storage resource 170 may include a RAID system, in certain embodiments.

In information handling system 100, I/O subsystem 140 may comprise a system, device, or apparatus generally operable to receive and transmit data to or from or within information handling system 100. I/O subsystem 140 may represent, for example, a variety of communication interfaces, graphics interfaces, video interfaces, user input interfaces, and peripheral interfaces. In some embodiments, I/O subsystem 140 may comprise a touch panel and a display adapter (not shown). The touch panel may include circuitry for enabling touch functionality in conjunction with a display device that is driven by the display adapter.

In the illustrated embodiment, information handling system 100 also includes an FPGA 190, which may be programmed to provide services to software applications running on any of the virtual machines 105 by loading a bitstream file for each such service into a respective reconfigurable region of FPGA 190. The bitstream file, which may include a binary image or an object file that is consumed by the FPGA in order to program its gates, may be referred to herein as simply a "bitstream." In various embodiments, a bitstream loaded on FPGA 109 may implement an accelerator program or another type of specialized routine that is called by application software on one or more of the virtual machines 105.

In at least some embodiments, information handing system 100 may also include one or more power control modules and one or more power supply units (not shown).

In FIG. 1, hypervisor 104 may comprise software and/or firmware generally operable to allow multiple operating systems to run on a single information handling system at the same time. This operability is generally allowed via virtualization, a technique for hiding the physical characteristics of information handling system resources from the way in which other systems, applications, or end users interact with those resources. Hypervisor 104 may be one of a variety of proprietary and/or commercially available virtualization platforms, including, but not limited to, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP. In one embodiment, hypervisor 104 may comprise a specially designed operating system (OS) with native virtualization capabilities. In another embodiment, hypervisor 104 may comprise a standard OS with an incorporated virtualization component for performing virtualization. In another embodiment, hypervisor 104 may comprise a standard OS running alongside a separate virtualization application. In this embodiment, the virtualization application of hypervisor 104 may be an application running above the OS and interacting with physical hardware 102 only through the OS. Alternatively, the virtualization application of hypervisor 104 may, on some levels, interact indirectly with physical hardware 102 via the OS, and, on other levels, interact directly with physical hardware 102 (e.g., similar to the way the OS interacts directly with physical hardware 102, and/or as firmware running on physical hardware 102), also referred to as device passthrough, such that the virtual machine may utilize a physical device directly without requiring the intermediate use of operating system drivers. As a further alternative, the virtualization application of hypervisor 104 may, on various levels, interact directly with physical hardware 102 (e.g., similar to the way the OS interacts directly with physical hardware 102, and/or as firmware running on physical hardware 102) without utilizing the OS, although still interacting with the OS to coordinate use of physical hardware 102.

As shown in FIG. 1, virtual machine 1 105-1 may represent a host for guest OS 108-1, virtual machine 2 105-2 may represent a host for guest OS 108-2 and virtual machine 3 105-3 may represent a host for guest OS 108-3. To allow multiple operating systems to be executed on system 100 at the same time, hypervisor 104 may virtualize certain hardware resources of physical hardware 102 and present virtualized computer hardware representations to each of virtual machines 105. In other words, hypervisor 104 may assign to each of virtual machines 105, for example, one or more processors from processor subsystem 120, one or more regions of memory in memory subsystem 130, one or more components of I/O subsystem 140, etc. The virtualized hardware representation presented to each of virtual machines 105 may comprise a mutually exclusive, or non-overlapping, set of hardware resources per virtual machine 105 (e.g., no hardware resources may be shared between virtual machines 105) or may comprise an overlapping set of hardware resources per virtual machine 105 (e.g., one or more hardware resources may be shared by two or more virtual machines 105).

In one embodiment, hypervisor 104 may assign hardware resources of physical hardware 102 statically (i.e., certain hardware resources are assigned to certain virtual machines, and this assignment does not vary over time). Additionally or alternatively, hypervisor 104 may assign hardware resources of physical hardware 102 dynamically (i.e., the assignment of hardware resources to virtual machines varies over time, for example, in accordance with the specific needs of the applications running on the individual virtual machines). Additionally or alternatively, hypervisor 104 may keep track of the hardware-resource-to-virtual-machine mapping, such that hypervisor 104 is able to determine the virtual machines to which a given hardware resource of physical hardware 102 has been assigned.

In FIG. 1, Each of virtual machines 105 may respectively include a guest operating system (guest OS) 108, along with any applications or other software (not shown) running on guest OS 108. Each guest OS 108 may represent an OS compatible with and/or supported by hypervisor 104 (even when guest OS is generally incompatible with physical hardware 102). In addition, each guest OS 108 may be a separate instance of the same operating system or an instance of three different operating systems. For example, in one embodiment, each guest OS 108 may comprise a LINUX OS. As another example, guest OS 108-1 may comprise a LINUX OS, guest OS 108-2 may comprise a MICROSOFT WINDOWS OS, and guest OS 108-3 may comprise a VXWORKS OS. Although system 100 is depicted as having three virtual machines 108-1, 108-2, and 108-3, it will be understood that, in particular embodiments, different numbers of virtual machines may be executing on information handling system 100 at any given time.

In operation of system 100 shown in FIG. 1, hypervisor 104 of information handling system 100 may virtualize the hardware resources of physical hardware 102 and present virtualized computer hardware representations to each of virtual machines 105. Each guest OS 108 of a virtual machine 105 may then begin to operate and run applications and/or other software (not shown). While operating, each guest OS 108 may utilize one or more hardware resources of physical hardware 102 assigned to the respective virtual machine by hypervisor 104.

In certain embodiments, a guest OS 108 or software application running on guest OS 108 on a virtual machine 105 may access services implemented on FPGA 190. In certain embodiments, FPGA 190 may be installed in hypervisor 104 as a virtual PCIe device. For example, information handling system 100 may include multiple processors connected to various devices, such as Peripheral Component Interconnect (PCI) devices and PCI express (PCIe) devices, including FPGA 190. The operating system (or BIOS) may include one or more drivers configured to facilitate the use of these devices.

FPGAs are typically not used in a virtualized environment nor are they typically shared between processes or virtual machines. In addition, until recently, FPGAs did not typically include reconfigurable regions (i.e., separately reconfigurable regions within a single FPGA). As FPGAs are increasingly made available in hosted cloud computing environments, their usage for virtual machine accelerators is also likely to increase. The systems and method disclosed herein may allow one or more FPGAs in a server to be used as a shared resource for virtual machines. For example, the techniques disclosed herein may be used to manage an FPGA card that is being used as a shared resource between virtual machines, various ones of which might or might not reside on the same physical computer hardware. More specifically, these techniques allow an FPGA service manager, such as FPGA service manager 220, to control or coordinate the programming, by users of virtual machines (e.g., guest operating systems, software applications, or other clients of the virtual machines) of reconfigurable regions of an FPGA with services that they need to perform their functions. The FPGA service manager may keep track of the concurrent users of the services implemented by the FPGA as users of the services drop in and out. The FPGA service manager may reclaim a region of the FPGA when it is no longer in use. In some embodiments, a single FPGA service manager may manage the programming and reclamation of reconfigurable regions on multiple FPGAs, keeping track of which services are loaded on each FPGA and the concurrent users of each of the services. In other embodiments, a system may include a respective FPGA service manager for each FPGA or FPGA card.

The techniques described herein may allow virtual machines to load or reconfigure respective regions of an FPGA themselves. In certain embodiments of the present disclosure, a virtual machine may provide a bitstream to the FPGA service manager for a service to be loaded into an FPGA for the use of a guest OS or software application running on the virtual machine. Alternatively, if a bitstream for a requested service is stored in a catalog maintained by the hypervisor, the FPGA service manager may obtain the bitstream from the catalog for loading into the FPGA. If a bitstream for a requested shared service has already been loaded into an FPGA, it may be accessed by one or more virtual machines other than the virtual machine at whose request the bitstream was loaded into the FPGA. In certain embodiment, a single virtual machine may access multiple services implemented by bitstreams loaded into an FPGA. This may include both a bitstream (or multiple bitstreams) provided by the same virtual machine (or a different virtual machine) and a bitstream (or multiple bitstreams) obtained from the catalog maintained by the hypervisor, in some embodiments.

Figure 2:
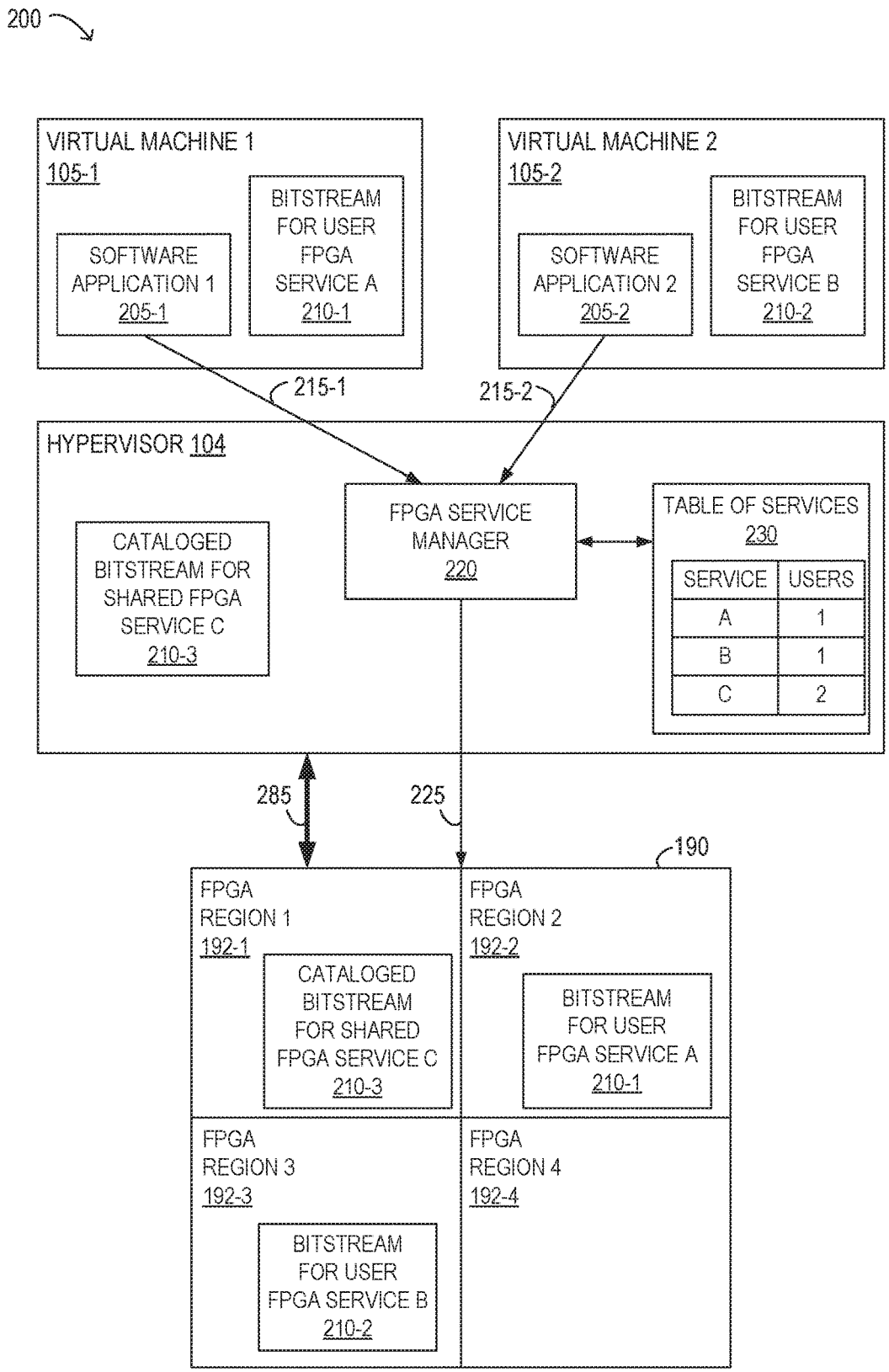
FIG. 2 is a block diagram illustrating, in more detail, selected elements of the information handling system depicted in FIG. 1.

Referring now to FIG. 2, selected elements 200 of an embodiment of the information handling system depicted in FIG. 1 are shown in more detail. It is noted that FIG. 2 is not drawn to scale but is a schematic illustration. As depicted in FIG. 2, operating on virtual machine 1 105-1 (e.g., on guest OS 108-1, not shown) is a software application 205-1, and operating on virtual machine 2 105-2 (e.g., on guest OS 108-2, not shown) may be a software application 205-2. Similarly, a software application 205-2 may operate on virtual machine 3 105-3 (e.g., on guest OS 108-3) (not shown in FIG. 2). While three virtual machines 105 are illustrated in FIG. 1 and two virtual machines 105 are illustrated in FIG. 2, an information handling system 100 may include any suitable number of virtual machines 105, in different embodiments. While each virtual machine 105 illustrated in FIG. 2 includes a single software application 205 running in a guest OS 108, the virtual machines 105 may include any suitable number of software applications 205, in different embodiments. As depicted in FIG. 2, virtual machine 1 105-1 maintains a bitstream for a user FPGA service A (shown as 210-1), and virtual machine 2 105-2 maintains a bitstream for a user FPGA service B (shown as 210-2). While each virtual machine 105 illustrated in FIG. 2 maintains a single bitstream 210, the virtual machines 105 may include any suitable number of bitstreams 210, in different embodiments.

As depicted in FIG. 2, hypervisor 104 includes an FPGA service manager 220 configured to manage the loading of multiple bitstreams, each implementing an FPGA service on behalf of one or more software applications executing in virtual machines in the system, into respective reconfigurable regions of the FPGA, and to reclaim regions of the FPGA when they are no longer needed. Hypervisor 104 maintains, in a catalog, a bitstream for a shared FPGA service C (shown as 210-3). In the depicted example, software application 205-1 sends a request 215-1 to FPGA service manager 220 for FPGA services A and C. In this example, bitstream 210-1 for FPGA service A is provided for loading into FPGA 190 by virtual machine 1 105-1, and bitstream 210-3 for FPGA service C is obtained for loading into FPGA 190 from the catalog maintained by hypervisor 104. In response to request 215-1, FPGA service manager 220 may load bitstream 210-3 into FPGA region 1 192-1 within FPGA 190, and may load bitstream 210-1 into FPGA region 2 192-2 within FPGA 190, for the benefit of software application 205-1.

In the depicted example, software application 205-2 sends a request 215-2 to FPGA service manager 220 for FPGA services B and C. In this example, bitstream 210-2 for FPGA service B is provided for loading into FPGA 190 by virtual machine 2 105-2. In this example, bitstream 210-3 has already been loaded into FPGA region 1 192-1. In response to request 215-1, FPGA service manager 220 may load bitstream 210-2 into FPGA region 3 192-3 within FPGA 190 for the benefit of software application 205-2. Thereafter, software application 205-2 may use both FPGA service B and FPGA service C, as implemented on FPGA 190.

As depicted in FIG. 2, FPGA service manager 220 may maintain a table of services 230 in which it records information about each bitstream instance that is loaded on FPGA 190, including the number of users that are concurrently using the service implemented by the bitstream instance at a given point in time. In certain embodiments, the table of services 230 may reside in memory on information handling system 100. For example, the table of services 230 may reside in memory that is local to, or accessible by, the hypervisor and the FPGA service manager thereof. As described herein, the table of services 230 may be used by the FPGA service manager to keep track of the bitstreams that are loaded in the FPGA and the number of concurrent users for each bitstream. For example, at the point in time illustrated in FIG. 2, FPGA service A has a single user (software application 205-1), FPGA service B has a single user (software application 205-2), and FPGA service C has two users (software applications 205-1 and 205-2). In some embodiments, each entry within table of services 230 may include an identifier of the specific bitstream instance that is loaded on the FPGA for a given service. In some embodiments, each entry within table of services 230 may include identifiers of each user of a given bitstream instance, e.g., identifiers of the virtual machines or the specific applications that use the service provided by a given bitstream instance loaded on the FPGA. It should be noted that FPGA service manager 220, the catalog containing the cataloged bitstream 210-3, and the table of services 230 may be disaggregated from the hypervisor, running either as a driver or inside a virtual machine, in alternate embodiments.

As noted above, FPGA 190 may be installed in hypervisor 104 as a virtual PCIe device, in some embodiments. In such embodiments, hypervisor 104 may communicate with FPGA 190 over a PCIe interface (shown as PCIe interface 285). In some embodiments, FPGA service manager 220 may control the loading of bitstreams into various regions 192 of FPGA 190 and the reclamation of various regions 192 of FPGA 190 using commands or control signals sent from FPGA service manager 220 to FPGA 190 (shown as 225). These commands or control signals may be implemented in different ways, in different embodiments. For example, in certain embodiments, the system may provide a software interface between virtual machines 105, guest operating systems 108, or software applications 205 and FPGA service manager 220, or between FPGA service manager 220 and FPGA 190. In some embodiments, commands for programming or reclaiming a region 192 of FPGA 190 may be sent in accordance with an application programming interface (API) provided in a library. In still other embodiments, commands for programming or reclaiming a region 192 of FPGA 190 may be provided through a virtual function. Other mechanisms for programming or reclaiming a region 192 of FPGA 190 are possible, in certain embodiments. In some embodiments, in response to a command or control signal 225 indicating that a bitstream is to be loaded into a particular region of FPGA 190, the bitstream may be provided to FGPA 190 over PCIe interface 285. For example, many FPGA vendors provide mechanisms to allow programming of an FPGA over a PCIe bus. In some embodiments, any communication between a software application 205 and an FGPA service 210 implemented on FPGA 190 may be made over PCIe interface 285.

Figure 3:
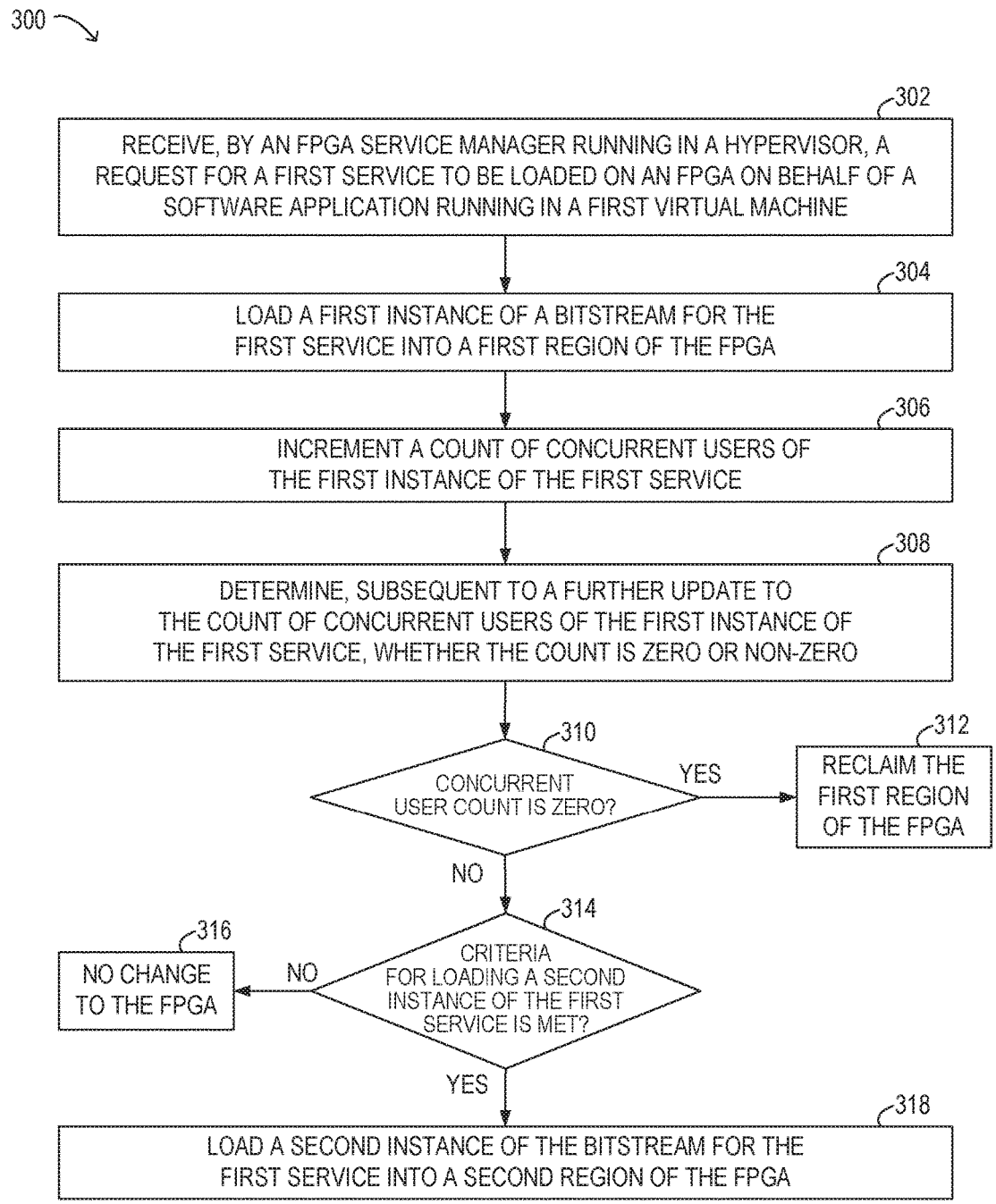
FIG. 3 is a flow diagram illustrating selected elements of an embodiment of a method for managing shared services in reconfigurable regions of an FPGA.

Referring now to FIG. 3, selected elements of an embodiment of a method 300 for managing shared services in reconfigurable FPGA regions, as described herein, are depicted in flow diagram form. Method 300 may be performed using information handling system 100 (see FIGS. 1 and 2). It is noted that certain operations described in method 300 may be optional or may be rearranged in different embodiments. Method 300 may begin, at step 302, with an FPGA service manager running in a hypervisor receiving a request for a first service to be loaded on an FPGA on behalf of a software application running in a first virtual machine. Method 300 may include, at 304, loading a first instance of a bitstream for the first service into a first region of the FPGA. As described in more detail herein, in some cases, the bitstream may be received from the first virtual machine. In other cases, the bitstream may be obtained from a catalog of bitstreams that is maintained by the hypervisor.

In the example embodiment illustrated in FIG. 3, method 300 may include, at 306 incrementing a count of concurrent users of the first instance of the first service. For example, the FPGA service manager may maintain, for each bitstream instance loaded in a respective region of the FPGA on behalf of one or more software applications running in a virtual machines, a respective count of concurrent users of the bitstream instance.

Method 300 may include, at 308, determining, subsequent to a further update to the count of concurrent users of the first instance of the first service, whether the count is zero or non-zero. For example, the FGPA service manager may determine when and whether to reclaim a reconfigurable region of the FPGA, dynamically, using a counter whose value reflects the number of concurrent users of a service implemented by a bitstream loaded into the reconfigurable region of the FPGA. The value of the counter may be incremented each time a user (e.g., a guest OS or software application running in a virtual machine) requests the use of the service, and may be decremented each time a software application that accesses the service terminates or each time a virtual machine on which such software application is running is migrated to different physical hardware resources. The counter value may go to zero if and when the last such virtual machine is migrated or the last such software application is terminated. If, at 310, it is determined that the count of concurrent users of the first instance of the first service is zero, method 300 may include reclaiming the first region of the FPGA, as in 312. If the first region of the FPGA is reclaimed, it may be subsequently be repurposed by the FPGA service manager. For example, subsequent to reclaiming the first region of the FPGA, the FPGA service manager may load an instance of a bitstream for a different service into the reclaimed region of the FPGA. In another example, subsequent to reclaiming the first region of the FPGA, the FPGA service manager may load an instance of a different bitstream version for the first service into the reclaimed region of the FPGA. If, at 310, it is determined that the count of concurrent users of the first instance of the first service is non-zero, method 300 may include, at 314, determining whether criteria for loading a second instance of the first service is met. Examples of such criteria are described in more detail below. If criteria for loading a second instance of the first service is met, the method may include loading a second instance of the bitstream for the first service into a second region of the FPGA, as in 318. Otherwise, there may be no change to the FPGA, as in 316.

In at least some embodiments of the present disclosure, a header format has been defined for information to be maintained in a catalog of FPGA services by the hypervisor. In certain embodiments, this header information may be added to existing bitstream formats for programming FPGAs. In some embodiments, multiple device-compatible bitstreams may be stored in the catalog for a single service.

One embodiment of an FPGA service catalog 400 is illustrated in FIG. 4. In some embodiments FPGA service catalog 400 may reside in non-volatile storage on disk within information handling system 100 (e.g., within local storage resource 150 or network storage resources 170). In the example embodiment illustrated in FIG. 4, service catalog 400 includes, for each service represented in the catalog, a service name (shown as 410), an indicator of a revision of the service (shown as 412), and one or more bits that represent an indication of backward compatibility for the cataloged revision of the service (shown as 414). The service name may, in some cases, indicate the functionality of the service, such as "Zlib compressor" or "IPSEC". In some embodiments, these three elements may be the only required elements in a catalog listing header for a given service. In the example embodiment illustrated in FIG. 4, the catalog also includes, for each service represented in the catalog, one or more execution constraints for the service, such as data representing a concurrent count maximum (shown as 416), a queue high threshold value (shown as 418), and a maximum bandwidth value (shown as 420). The value of concurrent count maximum 420 may indicate the maximum number of concurrent users that can be supported by a single instance of the bitstream. For example, the bitstream itself might only define a certain number of pipelines and, if oversubscribed, may run out of partially reconfigurable space or be otherwise unable to handle a large number of concurrent users. For some services, although a computation performed by the service may be pipelined in hardware to support multiple concurrent users, there may be one or more fixed-depth queues used by the service. Therefore, the number of concurrent users that a single instance of a bitstream for the given service may be finite, and exceeding that number may have an adverse effect on performance. The value of queue high threshold 418 may represent a maximum depth for one such queue that is internal to a service. In another example, a service may employ a queue pertaining to incoming network packets. This constraint may affect the number of users that a single instance of the bitstream can support at one time. Similarly, the value of maximum bandwidth value 420 may represent a bandwidth constraint for the service, which may limit the number of users that a single instance of the bitstream can support at one time.

As depicted in FIG. 4, catalog 400 may include any number of bitstreams for a given service, shown as binary images 430. Each bitstream, or binary image, includes header information, including bitstream-specific execution constraints, such as a respective tag indicating the FPGA or CPU class with which the particular bitstream is compatible (shown as 432), and respective performance or capability information for the particular bitstream (shown as 433). By storing multiple bitstream versions for a given service, the systems described herein may be able to accommodate the use of different types of physical FPGA devices when providing FPGA services for the use of virtual machines and the software applications that run on them. In other embodiments, more, fewer, or different elements may be included in catalog 400.

In certain embodiments, the FPGA service manager may decide when and whether to duplicate an instance of a bitstream that implements a given FPGA service for optimum performance, based on the execution constraints for the given service or for the specific version of the bitstream instance. For example, the FPGA service manager may selectively duplicate an instance of a bitstream that implements a given FPGA service based, at least in part, on the actual number of concurrent users at a given point in time, the concurrent count maximum 420, the queue high threshold value 418, the maximum bandwidth value 420, or a current bandwidth allocation. In certain embodiments, back pressure on a bitstream instance may be detected based on a queue threshold, which is filled and determined by the volume of tasks coming from the users. In other embodiments, the FPGA service manager may duplicate a bitstream instance based on a requested bandwidth and the maximum bandwidth capacity of the service, according to the execution constraint information contained in the bitstream header. If and when criteria for loading one or more additional copies of the bitstream are met, the FPGA service manager may load one or more additional instances of the bitstream into respective regions of the FPGA.

In certain embodiments, the FPGA service manager may accept FPGA service preloading requests. For example, if a genomics application is using bitstreams for services A and B in an alternating fashion, the application may request, and the FPGA service manager may perform, a preload of the bitstream for service B while the bitstream for A is in use and vice versa.

Figure 5:
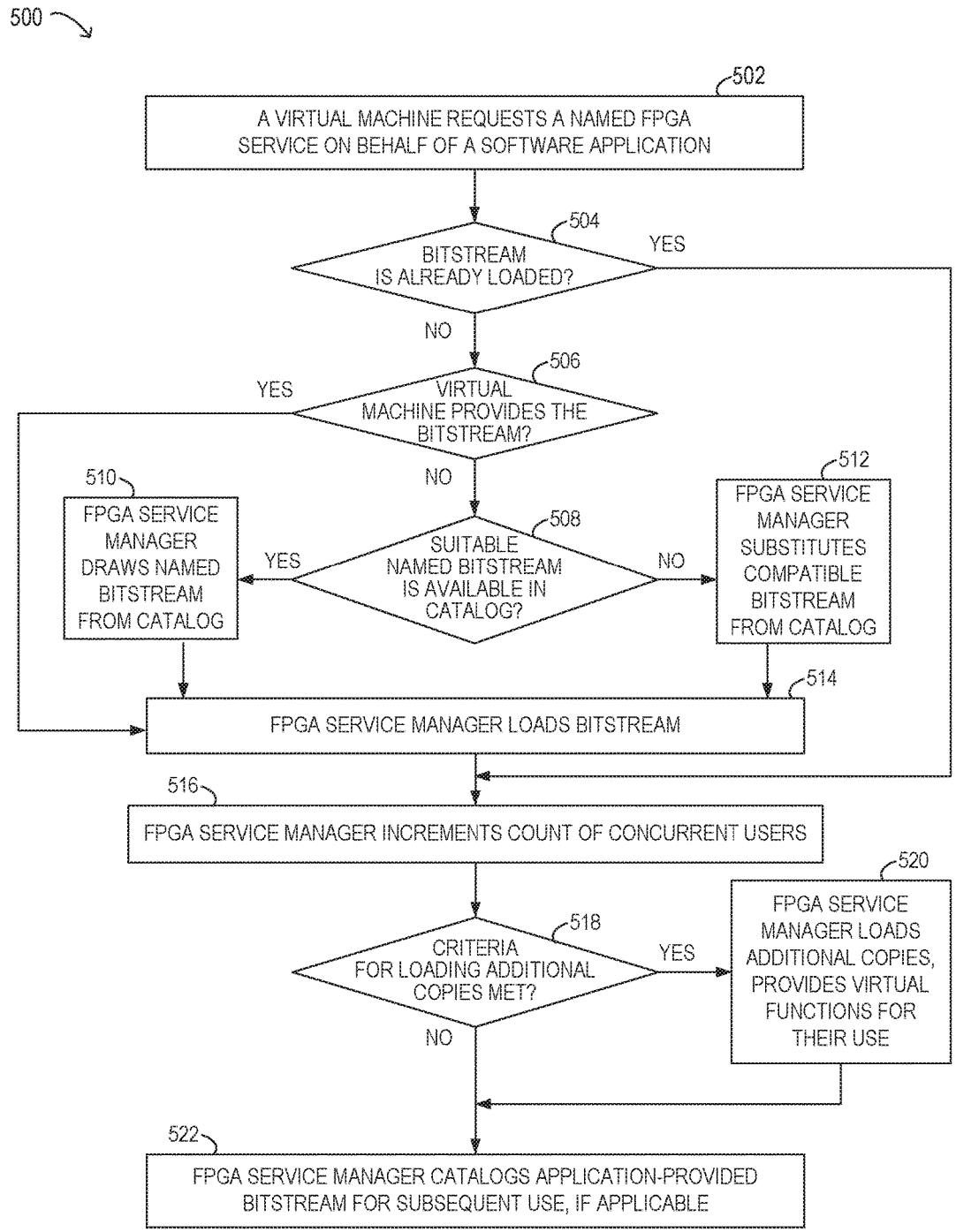
FIG. 5 is a flow diagram illustrating selected elements of an embodiment of a method for responding to a request for an FPGA service.

Referring now to FIG. 5, selected elements of an embodiment of method 500 for responding to a request for an FPGA service, as described herein, are depicted in flow diagram form. Method 500 may be performed using information handling system 100 (see FIGS. 1 and 2). It is noted that certain operations described in method 500 may be optional or may be rearranged in different embodiments.

In the example embodiment illustrated in FIG. 5, method 500 may begin, at 502, with a virtual machine requesting a named FPGA service on behalf of a software application running in the virtual machine. For example, the virtual machine may request service from a named accelerator to be provided by a bitstream loaded into an FPGA for the benefit of the software application. If, at 504, it is determined that the requested bitstream is already loaded on the FPGA, the method may proceed to 516. Otherwise, if it is determined that the requested bitstream is not already loaded on the FPGA, the method may include obtaining the bitstream for loading. If, at 506, the virtual machine provides the bitstream for loading, method 500 may proceed to 514. Otherwise, method 500 may proceed to 508. If, at 508, a suitable version of the named bitstream is available in the catalog maintained by the hypervisor, the FPGA service manager may draw the named bitstream from the catalog for loading, as in 510. For example, if a bitstream instance for the service having a tag 432 that indicates its compatibility with the FPGA into which it is to be loaded and having suitable performance capability characteristics (as indicated by header information 433) is available in the catalog, it may be loaded into the FPGA. Alternatively, the FPGA service manager may substitute a bitstream other than the named bitstream that is compatible with the FPGA and the software application on whose behalf the FPGA service was requested, as in 512. For example, in some embodiments, the FPGA service manager may be configured to substitute a bitstream other than the named bitstream if there is not an appropriate device-compatible bitstream instance for the named service in the catalog, but the catalog contains a suitable alternative. For example, the FPGA service manager may load an instance of a bitstream for an alternate service with a different name it if determines that the bitstream for the alternate service provides equivalent functionality. In some embodiments, the FPGA service manager may maintain or access an equivalence table that maps certain named services with alternately named services that provide equivalent functionality and are compatible with the target FPGA. For example, the catalog may include multiple bitstreams and bitstream versions for certain industry standard functions or commonly used mathematical algorithms, and the FPGA service manager may select an appropriate one of the bitstreams for loading into an FPGA in the system in response to a request for a particular named service based on the mappings in an equivalence table. Note that the response to an error condition in which no suitable bitstream for a requested service is available is not shown in FIG. 5. In this case, the interface between the FPGA service manager and the caller may be configured to provide an indication of this condition, after which the application software may make a decision to proceed with a software (non-accelerated) version of the requested service.

Method 500 may include, at 514, the FPGA service manager loading the bitstream and, at 516, the FPGA service manager incrementing a count of concurrent users of the bitstream. For example, the FPGA service manager may update an entry for the bitstream instance in a table, such as table 230 illustrated in FIG. 2. Method 500 may include, subsequent to incrementing of the count of concurrent users, determining whether criteria for loading one or more additional copies of the bitstream are met, as in 518. If so, method 500 may include, at 520, the FPGA service manager loading one or more additional copies of the bitstream into respective regions of the FPGA and providing virtual functions for their use. In some embodiments, method 500 may also include the FPGA service manager cataloging the application-provided bitstream for subsequent use, if applicable, as in 522. In one example, in reference to in the system illustrated in FIG. 2, FPGA service manager 220 may pro-actively store a copy of bitstream 210-1, which was provided by virtual machine 1 105-1 for loading into FPGA 190, or a copy of bitstream 210-2, which was provided by virtual machine 2 105-2 for loading into FPGA 190, in an FPGA service catalog maintained by the hypervisor for subsequent use by these or other virtual machines 105. In some embodiments, FPGA service manager 220 may not be authorized to catalog certain bitstreams 210 that are provided by one of the virtual machines 105, because these bitstreams are not intended to be shared with other virtual machines 105. In other embodiments, FPGA service manager 220 may not be authorized to catalog any bitstreams 210 that are provided by one of the virtual machines 105 without receiving explicit authorization to do so.

Figure 6:
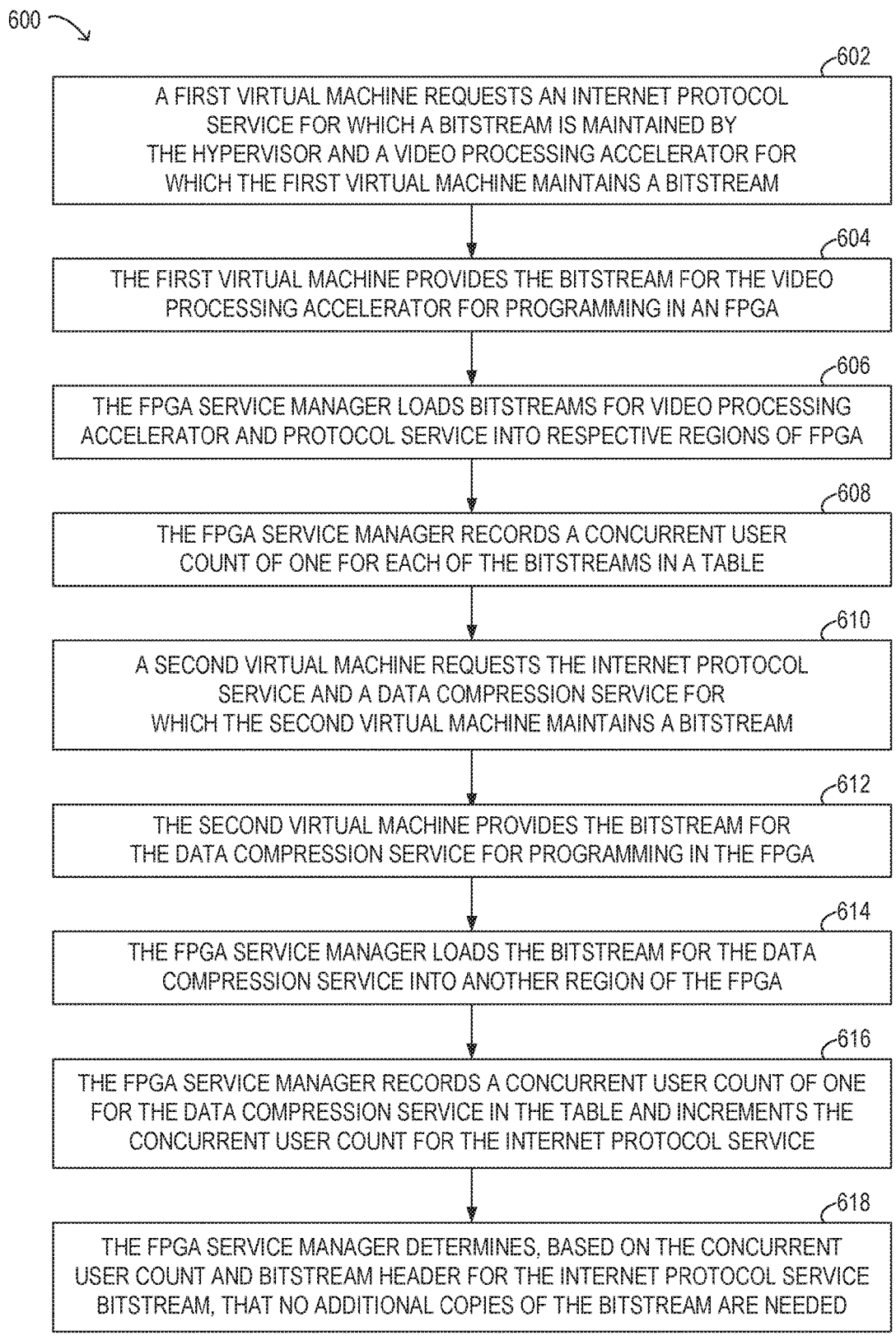
FIG. 6 is a flow diagram illustrating selected elements of an embodiment of a method for managing FPGA services requested by multiple virtual machines in an example system.

Referring now to FIG. 6, selected elements of an embodiment of a method 600 for managing FPGA services requested by multiple virtual machines in an example system, as described herein, are depicted in flow diagram form. Method 600 may be performed using information handling system 100 (see FIGS. 1 and 2). In this example, the system includes a combination of accelerators, some of which are provided by the hypervisor and some of which are provided by the requesting virtual machines. In this example, it may be assumed that physical interfaces for PCIe, which are needed for device enumeration, are maintained by the BIOS. In this example, a first virtual machine has a video processing accelerator (e.g., an image filtering accelerator) that it uses in a content delivery network. A second virtual machine has a content catalog manager that includes its own data compression service. Both virtual machines use an internet protocol service in accordance with the Internet Protocol Security (IPSEC) network protocol suite. This service is used to authenticate and encrypt data packets that are exchanged over a network. It is noted that certain operations described in method 600 may be optional or may be rearranged in different embodiments.

As illustrated in FIG. 6, method 600 may begin, at 602, with a first virtual machine requesting the internet protocol service for which a bitstream is maintained by the hypervisor and the video processing accelerator for which the first virtual machine maintains a bitstream. The method may include, at 604, the first virtual machine providing the bitstream for the video processing accelerator for programming in an FPGA. Method 600 may also include, at 606, the FPGA service manager loading the bitstreams for the video processing accelerator and for the internet protocol service into respective regions of the FPGA. At 608, the method may include the FPGA service manager recording a concurrent user count of one for each of these bitstreams in a table, such as table 230 illustrated in FIG. 2.

Method 600 may include, at 610, a second virtual machine requesting the internet protocol service and the data compression service for which the second virtual machine maintains a bitstream. The method may include, at 612, the second virtual machine providing the bitstream for the data compression service for programming in the FPGA. At 614, the method may include the FPGA service manager loading the bitstream for the data compression service into another region of the FPGA, i.e., a region of the FPGA other than the regions in which the bitstreams for the video processing accelerator and for the internet protocol service were loaded.

Method 600 may also include, at 616, the FPGA service manager recording a concurrent user count of one for the data compression service in the table and incrementing the concurrent user count for the protocol service to two. The method may also include, at 618, the FPGA service manager determining, based on the concurrent user count and a bitstream header for the internet protocol service bitstream, that no additional copies of the bitstream are needed. For example, the FPGA service manager may determine that the internet protocol service can handle two concurrent users with its pipeline design without incurring a performance penalty and may choose not to load a duplicate copy of the bitstream for the internet protocol bitstream in the FPGA.

As described above, an information handling system may include an FPGA and a hypervisor configured to manage one or more virtual machines operating on the information handling system. The hypervisor may include an FPGA service manager configured to receive from a software application running in a virtual machine a request for an FPGA service, to load a bitstream for the service into a first region of the FPGA, to increment a count of concurrent users of the bitstream, to determine, subsequent to a further update to the count, whether the count is zero or non-zero, and to reclaim the first region of the FPGA if the count is zero. The bitstream may be received from the virtual machine or obtained from a catalog of bitstreams maintained on the hypervisor. The FPGA service manager may load a second instance of the bitstream into a second region of the FPGA dependent on execution constraints specified in a bitstream header, or may load a bitstream for a second service into the second region. The bitstream may be selected from among multiple cataloged versions of the bitstream based on the FPGA type.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   a field-programmable gate array (FPGA); and
   a hypervisor configured to manage one or more virtual machines operating on the information handling system;
   wherein the hypervisor comprises an FPGA service manager configured to:
   receive a request for a first service to be loaded on the FPGA on behalf of a software application running in a first virtual machine;
   load a first instance of a bitstream for the first service into a first region of the FPGA;
   increment a count of concurrent users of the first instance of the bitstream for the first service;
   determine, subsequent to a further update to the count of concurrent users of the first instance of the bitstream for the first service, whether the count of concurrent users of the first instance of the bitstream for the first service is zero or non-zero; and
   reclaim the first region of the FPGA in response to determining that the count of concurrent users of the first instance of the bitstream for the first service is zero.

2. The information handling system of claim 1, wherein to load the first instance of the bitstream for the first service into the first region of the FPGA, the FPGA service manager is configured to receive the bitstream for the first service from the first virtual machine.

3. The information handling system of claim 1, wherein:
   the hypervisor maintains a catalog comprising bitstreams for a plurality of services; and
   to load the first instance of the bitstream for the first service into the first region of the FPGA, the FPGA service manager is configured to obtain the bitstream for the first service from the catalog.

4. The information handling system of claim 3, wherein:
   the catalog comprises multiple bitstreams for the first service, each of which implements a respective version of the first service;
   each of the multiple bitstreams for the first service comprises a header including an indicator of an FPGA type with which the respective version of the first service is compatible;
   to load the first instance of the bitstream for the first service into the first region of the FPGA, the FPGA service manager is configured to obtain a selected one of the multiple bitstreams for the first service from the catalog, the selection being dependent on the indicator in the header of the selected bitstream.

5. The information handling system of claim 3, wherein:
   the catalog comprises, for each of the plurality of services, data representing execution constraints for the service;
   the catalog comprises multiple bitstreams for the first service, each of which implements a respective version of the first service;
   the execution constraints for the first service include a respective header for each of the multiple bitstreams for the first service comprising data representing bitstream-specific execution constraints.

6. The information handling system of claim 5, wherein the FPGA service manager is further configured to:
   receive a request for the first service on behalf of another software application running in the one or more virtual machines;
   increment the count of concurrent users of the first instance of the bitstream for the first service;
   determine, dependent on the count of concurrent users of the first instance of the bitstream for the first service and on the execution constraints for the first service, whether criteria for loading a second instance of the bitstream for the first service on the FPGA is met;
   load a second instance of the bitstream for the first service into a second region of the FPGA in response to determining that criteria for loading a second instance of the bitstream for the first service on the FPGA is met; and
   refrain from loading a second instance of the bitstream for the first service into a second region of the FPGA in response to determining that criteria for loading a second instance of the bitstream for the first service on the FPGA is not met.

7. The information handling system of claim 1, wherein the FPGA service manager is further configured to:
   receive a request for a second service to be loaded on the FPGA on behalf of the software application running in the first virtual machine;
   load a first instance of a bitstream for the second service into a second region of the FPGA;
   increment a count of concurrent users of the first instance of the bitstream for the second service.

8. The information handling system of claim 1, wherein the FPGA service manager maintains, for each bitstream instance loaded in a respective region of the FPGA on behalf of one or more software applications running in the one or more virtual machines, a respective count of concurrent users of the bitstream instance.

9. A method for managing shared services in reconfigurable regions of a field-programmable gate array (FPGA), comprising:
   receiving, by an FPGA service manager running in a hypervisor, a request for a first service to be loaded on the FPGA on behalf of a software application running in a first virtual machine;
   loading a first instance of a bitstream for the first service into a first region of the FPGA;
   incrementing a count of concurrent users of the first instance of the bitstream for the first service;
   determining, subsequent to a further update to the count of concurrent users of the first instance of the bitstream for the first service, whether the count of concurrent users of the first instance of the bitstream for the first service is zero or non-zero; and
   reclaiming the first region of the FPGA in response to determining that the count of concurrent users of the first instance of the bitstream for the first service is zero.

10. The method of claim 9, wherein loading the first instance of the bitstream for the first service into the first region of the FPGA comprises receiving the bitstream for the first service from the first virtual machine.

11. The method of claim 9, wherein:
the hypervisor maintains a catalog comprising bitstreams for a plurality of services; and
loading the first instance of the bitstream for the first service into the first region of the FPGA comprises obtaining the bitstream for the first service from the catalog.

12. The method of claim 11, wherein:
the catalog comprises multiple bitstreams for the first service, each of which implements a respective version of the first service;
each of the multiple bitstreams for the first service comprises a header including an indicator of an FPGA type with which the respective version of the first service is compatible;
loading the first instance of the bitstream for the first service into the first region of the FPGA comprises obtaining a selected one of the multiple bitstreams for the first service from the catalog, the selection being dependent on the indicator in the header of the selected bitstream.

13. The method of claim 11, wherein:
the catalog comprises, for each of the plurality of services, data representing execution constraints for the service;
the catalog comprises multiple bitstreams for the first service, each of which implements a respective version of the first service;
the execution constraints for the first service include a respective header for each of the multiple bitstreams for the first service comprising data representing bitstream-specific execution constraints.

14. The method of claim 13, further comprising:
receiving a request for the first service on behalf of another software application running in a second virtual machine;
incrementing the count of concurrent users of the first instance of the bitstream for the first service;
determining, dependent on the count of concurrent users of the first instance of the bitstream for the first service and on the execution constraints for the first service, whether criteria for loading a second instance of the bitstream for the first service on the FPGA is met; and
loading a second instance of the bitstream for the first service into a second region of the FPGA in response to determining that criteria for loading a second instance of the bitstream for the first service on the FPGA is met.

15. The method of claim 13, further comprising:
receiving a request for the first service on behalf of another software application running in a second virtual machine;
incrementing the count of concurrent users of the first instance of the bitstream for the first service;
determining, dependent on the count of concurrent users of the first instance of the bitstream for the first service and on the execution constraints for the first service, whether criteria for loading a second instance of the bitstream for the first service on the FPGA is met; and
refraining from loading a second instance of the bitstream for the first service into a second region of the FPGA in response to determining that criteria for loading a second instance of the bitstream for the first service on the FPGA is not met.

16. The method of claim 9, wherein:
the FPGA service manager maintains, for each bitstream instance loaded in a respective region of the FPGA on behalf of one or more software applications running in the one or more virtual machines, a respective count of concurrent users of the bitstream instance; and
the method further comprises:
receiving a request for a second service to be loaded on the FPGA on behalf of the software application running in the first virtual machine;
loading a first instance of a bitstream for the second service into a second region of the FPGA; and
incrementing a count of concurrent users of the first instance of the bitstream for the second service.

17. A system, comprising:
a field-programmable gate array (FPGA);
a processor subsystem having access to a memory subsystem, wherein the memory subsystem stores instructions executable by the processor subsystem that, when executed by the processor subsystem, cause the processor subsystem to implement an FPGA service manager, wherein the FPGA service manager is configured to:
receive a request for a first service to be loaded on the FPGA on behalf of a software application running in a first virtual machine;
load a first instance of a bitstream for the first service into a first region of the FPGA;
increment a count of concurrent users of the first instance of the bitstream for the first service;
determine, subsequent to a further update to the count of concurrent users of the first instance of the bitstream for the first service, whether the count of concurrent users of the first instance of the bitstream for the first service is zero or non-zero; and
reclaim the first region of the FPGA in response to determining that the count of concurrent users of the first instance of the bitstream for the first service is zero.

18. The system of claim 17, wherein to load the first instance of the bitstream for the first service into the first region of the FPGA, the FPGA service manager is configured to receive the bitstream for the first service from the first virtual machine.

19. The system of claim 17, wherein:
the FPGA service manager maintains a catalog comprising bitstreams for a plurality of services;
the catalog comprises multiple bitstreams for the first service, each of which implements a respective version of the first service;
each of the multiple bitstreams for the first service comprises a header including an indicator of an FPGA type with which the respective version of the first service is compatible; and
to load the first instance of the bitstream for the first service into the first region of the FPGA, the FPGA service manager is configured to obtain a selected one of the multiple bitstreams for the first service from the catalog, the selection being dependent on the indicator in the header of the selected bitstream.

20. The system of claim 17, wherein:
the FPGA service manager maintains a catalog comprising bitstreams for a plurality of services;
the catalog comprises, for each of the plurality of services, data representing execution constraints for the service;

the catalog comprises multiple bitstreams for the first service, each of which implements a respective version of the first service;

the execution constraints for the first service include a respective header for each of the multiple bitstreams for the first service comprising data representing bitstream-specific execution constraints; and the FPGA service manager is further configured to:
   receive a request for the first service on behalf of another software application running in the one or more virtual machines;
   increment the count of concurrent users of the first instance of the bitstream for the first service;
   determine, dependent on the count of concurrent users of the first instance of the bitstream for the first service and on the execution constraints for the first service, whether criteria for loading a second instance of the bitstream for the first service on the FPGA is met;
   load a second instance of the bitstream for the first service into a second region of the FPGA in response to determining that criteria for loading a second instance of the bitstream for the first service on the FPGA is met; and
   refrain from loading a second instance of the bitstream for the first service into a second region of the FPGA in response to determining that criteria for loading a second instance of the bitstream for the first service on the FPGA is not met.

\* \* \* \* \*